United States Patent [19]
O'Young et al.

[11] Patent Number: 5,702,674
[45] Date of Patent: *Dec. 30, 1997

[54] FRAMEWORK METAL-SUBSTITUTED MANGANESE OXIDE OCTAHEDRAL MOLECULAR SIEVE AND PROCESS FOR ITS PREPARATION

[75] Inventors: Chi Lin O'Young, Beacon, N.Y.; Yan-Fei Shen, Storrs, Conn.; Roberto Nguyen Dequzman, Ashford, Conn.; Steven Lawrence Suib, Storrs, Conn.

[73] Assignee: Texaco Inc., White Plains, N.Y.

[*] Notice: The term of this patent shall not extend beyond the expiration date of Pat. No. 5,578,282.

[21] Appl. No.: 667,487

[22] Filed: Jun. 24, 1996

Related U.S. Application Data

[63] Continuation of Ser. No. 215,496, Mar. 21, 1994, abandoned.

[51] Int. Cl.[6] ................ G01G 45/00; G01G 45/12
[52] U.S. Cl. .................. 423/50; 423/599; 423/700; 423/713
[58] Field of Search .................. 423/700, 713, 423/599, 50; 502/324

[56] References Cited

U.S. PATENT DOCUMENTS 5,340,562  8/1994  O'Young et al. .............. 423/599

FOREIGN PATENT DOCUMENTS 4115951  11/1991  Germany.

OTHER PUBLICATIONS

Tsuji, et al, "Synthesis of Cryptomelane–Type . . . Metal Ions", Solvent Ext. and Ion Ex., 2(2), pp. 253–274, 1984, no month.

Shen, et al., "Manganese Oxide . . . and Applications," Science, vol. 260, Apr. 23, 1993, pp. 511–515.

Burns, et al. Marine Minerals, Reviews in Mineralogy, Min. Soc. of Amer., pp. 1–46, 1979, no month.

O'Young, Chi–Lin, "Hydrothermal synthesis of manganese oxides with tunnel structures", Chemical Abstracts vol. 116, No. 12, 23 Mar. 1992, Abstract No. 119607g.

McKenzie, R.M., "Synthesis of birnessite, cryptomelane, and some other oxides and hydroxides of manganese", Chemical Abstracts vol. 76, No. 4, 24 Jan. 1972, Abstract No. 20753v.

Yamamoto, N., et al., "Hydrothermal synthesis of Rb–containing manganese dioxides polymorphs having structures of 2*infinity, 2*5 and 2*2 tunnel sizes", Database Inspec. Institute of Electrical Engineers, Inspec. No. 2958584, Dec. 1986.

Giovanoli et al., "A New Synthesis of Hollandite, A Possibility for Immobilization of Nuclear Waste", *Chimia*, 35, (1981) pp. 52–55, no month.

Chang et al., "Manganese Nodules as Demetalation Catalysts", no date.

Shen et al., "Manganese Oxide Octahedral Molecular Sieves: Preparation, Characterization, and Applications", Science, Apr. 23, 1993, vol. 260, pp. 511–515.

Yin t al., "Temperature Program Desorption and Reduction Studies of Octahedral Molecular Sieves", J. Weitkamp et al. (Eds.) *Zeolites and Related Micorporous Materials: State of the Art 1994* Studies in Surface Science and Catalysis, vol. 84, 1994 Elsevier Science B.V., no month.

(List continued on next page.)

*Primary Examiner*—Steven Bos
*Attorney, Agent, or Firm*—Henry H. Gibson; Peter G. Dilworth

[57] ABSTRACT

Manganese oxide octahedral molecular sieves are provided in which a portion of the framework manganese is substituted by at least one other metal, e.g., a transition metal.

11 Claims, 5 Drawing Sheets

OTHER PUBLICATIONS

Chi–Lin O'Young, "Hydrothermal Synthesis of Manganese Oxides with Tunnel Structures", *Synthesis of Microporous Materials*, vol. II, pp. 333–340, M.L. Occelli, H.S. Robson Eds., Van Nostrand Reinhold, NY, 1992, no month.

De Guzman et al., "Role of Cyclic Voltammetry in Characterizing Solids: Natural and Synthetic Manganese Oxide Octahedral Molcular Sieves", *Chemistry of Materials*, American Chemical Society, 1993, vol. 5, pp. 1395–1400, no month.

Shen et al., "Octahedral Molecular Sieves: Preparation, Characterization and Applications," *J. Chem. Soc., Chem. Communications*, Issue 17, 1992, pp. 1213–1214, no month.

Shen et al., "Synthetic Todorokite: Preparaton, Characterization and Applications", *Ninth International Zeolite Conference, Extended Abstracts and Program*, Wiggins et al. Eds., 1992, RP230, no month.

Shen et al., "Synthesis of Manganese Oxide Octahedral Molecular Sieves (CMS), *Zeolites and Microporous Crystals*", 1994, pp. 19–24, no month.

Turner et al., "Todorokites: A New Family of Naturally Occurring Manganese Oxides", Science, vol. 212, pp. 1024–1027, 29 May 1981.

Effects of Temperature and pH on the Synthesis of OMS-2 Structures

FIG. 5

FRAMEWORK METAL-SUBSTITUTED MANGANESE OXIDE OCTAHEDRAL MOLECULAR SIEVE AND PROCESS FOR ITS PREPARATION

This is a continuation of application Ser. No. 08/215,496 filed on Mar. 21, 1994, now abandoned.

BACKGROUND OF THE INVENTION

This invention relates to a manganese oxide octahedral molecular sieve in which a portion of the framework manganese is substituted with one or more other metal cations and to a process for its preparation.

Zeolites and zeolite-like materials constitute a well-known family of molecular sieves. These materials are tetrahedral coordinated species with $TO_4$ tetrahedra (in which T is silicon, aluminum, phosphorus, boron, beryllium, gallium, etc.) serving as the basic structural unit. Through secondary building units, a variety of frameworks with different pore structures can be constructed. Like tetrahedra, octahedra can also serve as the basic structural units of molecular sieves.

Manganese oxide octahedral molecular sieves (OMS) with one-dimensional tunnel structures represent another family of molecular sieves. Such materials have been detected in samples of terrestrial origin and are also known to occur in manganese nodules recovered from the ocean floor. Manganese modules have been described as useful catalysts in the oxidation of carbon monoxide, methane and butane (U.S. Pat. No. 3,214,236), the reduction of nitric oxide with ammonia (*Atmospheric Environment*, Vol. 6, p.309 (1972)) and the demetallation of topped crude in the presence of hydrogen (*Ind. Eng. Chem. Proc. Dev.*, Vol. 13 p.315 (1974)).

The hollandites constitute a family of naturally occurring hydrous manganese oxides with tunnel structures (also described as "framework hydrates") in which Mn can be present as $Mn+^4$ and other oxidation states, the tunnels can vary in size and configuration and various mono- or divalent cations can be present in the tunnels. The materials are very similar to zeolites with respect to the framework tunnel structure except that the basic unit of the hollandites is an octahedron, $MnO_6$, not a tetrahedron. The hollandite structure consists of $MnO_6$ octehedra which share edges to form double chains and the octahedral of the double chains share corners with adjacent double chains to form a 2×2 tunnel structure. The size of these tunnels is 4.6 Å square. Ba, K, Na and Pb ions are present in the tunnels and coordinated to the oxygens of the double chains. The identity of the tunnel cations determines the mineral species. Specific hollandite species include hollandite ($BaMn_8O_{16}$), cryptomelane ($KMn_8O_{16}$), manjiroite ($NaMn_8O_{16}$), and coronadite ($PbMn_8O_{16}$).

Syntheses of hollandites have been reported in the literature. See, e.g., M. Tsuji et al., "Synthesis of Cryptomelane-Type Hydrous Manganese Dioxide...", *Solvent Extractions and Ion Exchange*, Vol. 2, pp. 253–74 (1984); K. M. Parida et al., "Chemical Composition Microstructure and other Characteristics of some Synthetic $MnO_2$ of Various Crystalline Modifications", *Electrochimica Acta*, Vol. 26, pp. 435–43 (1981); and P. Strobel et al., "Thermal and Physical Properties of Hollandite-Type $K_{1.3}Mn_8O_{16}$ and $(K_xH_3O)_xMn_8O_{16}$", *J. Solid State Chemistry*, Vol. 55, pp. 67–73 (1984). However, the procedures are unreliable and considerable difficulties have been experienced. Villa et al. report the synthesis of oxide systems containing Mn in combination with other elements in "Co-Mn-Ti-K Oxide Systems", *Applied Catalysis*, Vol. 26, pp. 161–173 (1986). Torardi et al. report the synthesis of a hollandite-type molybdenum compound ($K_2Mo_8O_{16}$) by hydrothermal reaction of basic $K_2MoO_4$ solutions with Mo metal in "Hydrothermal Synthesis of a New Molybdenum Hollandite," *Inorganic Chemistry*, Vol. 23, pp. 3281–84(1984).

Todorokites, $(Na,Ca,Mn)Mn_3O_7 \cdot xH_2O$, possess 3×3 tunnels, about 6.9 Å square, and monoclinic cells. Todorokites and related species are described by Turner et al. in "Todorokites: A new Family of Naturally Occurring Manganese Oxides", *Science*, Vol. 212, pp. 1024–1026 (1981). The authors speculate that since todorokites are often found in deep-sea manganese nodules containing high concentrations of copper and nickel, it is probable that such metals substitute for $Mn^{+2}$ in the octahedral framework.

Todorokites have attracted particular interest because of their relatively large tunnel dimension and their cation-exchange behavior which is similar to that of zeolites (Shen et al., "Manganese Oxide Octahedral Molecular Sieves: Preparation, Characterization, and Applications", *Science*, Vol. 260, pp. 511–515 (1993)). The naturally occurring todorokites are poorly crystalline, impure in composition and coexist with other manganese oxide minerals. Results of high resolution transmission electron microscopy (HRTEM) show that natural todorokite contains random intergrowth material of 3×2, 3×3, 3×4 and 3×5 tunnel structure. Because of their disordered structure, the natural todorokites exhibit variable and non-reproducible catalytic activity, a drawback which militates against their commercial use.

Transition metals are employed as active components in many industrial catalysts. Traditionally, these catalysts are prepared by impregnating the transition metals on a support such as alumina or silica to form a supported metal catalyst. Catalysts prepared by the impregnation method usually do not have good dispersion and homogeneity of the metal phases on the surface. Recently, extensive efforts have been made to isomorphously substitute the tetrahedral silicon of zeolites with transition metals to form metallosilicates. It is believed that transition metals occupying sites in the zeolite framework might confer some interesting catalytic activities because of the resulting unique structures. However, the thermal stability of these framework substituted materials is not good because of the tetrahedral symmetry of the transition metals in the zeolite framework.

Like zeolites, manganese oxide octahedral molecular sieves have cation-exchange properties. The counter ions can be exchanged with protons to provide the hydrogen form of the materials having usefulness as acid catalysts. Due to their tunnel structures, the framework-substituted manganese oxide octahedral molecular sieves are also useful as shape selective catalysts.

Hereinbelow, manganese oxide octahedral molecular sieves possessing the 3×3 tunnel structure (as in the todorokites) will be referred to by the designation OMS-1 and the corresponding framework-substituted molecular sieves will be referred to by the designation [M]-OMS-1 in which [M] indicates the framework metal cation(s) other than manganese. Manganese oxide octahedral molecular sieves possessing the 2×2 tunnel structure (as in the hollandites) will be referred to herein by the designation OMS-2 and the corresponding framework-substituted molecular sieves will be referred to by the designation [M]-OMS-2 in which [M] indicates the framework metal cation(s) other than manganese.

SUMMARY OF THE INVENTION

General objects of the invention include providing a manganese oxide octahedral molecular sieve having a portion of its framework manganese substituted with one or more other metal cation species, e.g., one or more transition metals, and a process for its preparation.

It is a particular object of the invention to provide a synthetic manganese oxide octahedral molecular sieve corresponding to a naturally occurring molecular sieve, e.g., of the hollandite or todorokite type, and containing the aforesaid framework substitution.

In keeping with these and other objects of the invention, there is provided a manganese oxide octahedral molecular sieve of substantially homogeneous tunnel structure in which a portion of the framework manganese is substituted with at least one framework-substituting metal other than manganese.

The expression "substantially homogeneous tunnel structure" as used herein refers to the highly ordered and consistent structure of the framework substituted manganese oxide octahedral molecular sieves of this invention distinguishing them from their less ordered naturally occurring counterparts which contain randomly distributed intergrowth material having a variety of tunnel structures. Because of their ordered and consistent structure, the framework substituted manganese oxide octahedral molecular sieves of this invention are entirely suitable as catalysts for such commercial operations as CO oxidation, oxidative dehydrogenation of hydrocarbons and NO reduction or decomposition.

A framework substituted manganese oxide octahedral molecular sieve in accordance with this invention can be prepared by the process which comprises reacting a source of manganese cation, a source of framework-substituting metal cation, a source of counter cation and a source of permanganate anion under conditions of temperature, pressure and pH effective to produce the desired framework-substituted manganese oxide octahedral molecular sieve.

The reaction conditions such as the ratio of manganese cation to permanganate anion, temperature and pH can be varied to produce manganese oxide hydrates of various structures including pyrolusite, nsutite, romanechite, todorokite and hollandite.

DETAILED DESCRIPTION OF THE INVENTION

According to the present invention, a source of manganese cation, a source of framework-substituting metal cation, a source of counter cation and a source of permanganate anion are reacted under conditions of temperature, pressure and pH effective to produce the desired framework-substituted manganese oxide octahedral molecular sieves with conditions varied to produce different structures of such minerals. The expression "framework substituted" is used to indicate that one or more metal cations other than manganese cations are present in the framework structure in place of a portion of the manganese cations. The manganese oxide octahedral molecular sieves of the present invention are prepared by direct synthesis with the framework-substituting metal assuming positions in the framework according to its concentration in the reaction mixture and other reaction conditions.

The reaction mixture can be heated in a closed system, e.g., in an autoclave, so that a given temperature will produce a predictable degree of autogenous pressure which is effective to complete the reaction in the desired time. Alternatively, the reaction mixture can be heated in an open system, e.g., in a reflux condenser, with results similar to those achieved with a closed system.

As for the reactants, in general any suitable soluble manganese salt, whether inorganic or organic, can be employed as the source of manganese cation. Suitable salts include, for example, the sulfate, nitrate, perchlorate and salts of organic acids such as acetates.

According to the present invention, a portion of the framework manganese of the manganese oxide octahedral molecular sieves is replaced with one or more framework-substituting metal cations $M^{+n}$ (where n indicates an oxidation state which is stable in solution), e.g., a transition metal, preferably from Groups IB, IIB and VIII of the Periodic Table of the elements, lanthanum, iridium, rhodium, palladium and platinum. Examples of useful framework-substituting metals include Mg, Fe, Co, Ni, Cu, Ti, V, Cd, Mo, W, Cr and Zn. Preferred metals include Co, Cu, Ni, Zn, La and Pd. Metal cation(s) $M^{+n}$ should be present in the reaction mixture in a concentration effective to introduce the desired proportions of the metal(s) into the framework of the product's structure during the course of the reaction. Therefore, any suitable salt (inorganic or organic) of the selected metal(s) can be used which is sufficiently soluble provided, of course, that the anion does not interfere with the other reactants or the course of the reaction. For example, the nitrates, sulfates, perchlorates, alkoxides, acetates, and the like, can be used with generally good results.

The larger counter cations such as potassium and barium can themselves serve as templates for crystallization and remain in the tunnel structures of certain manganese oxide hydrates, particularly those of the [M]-OMS-2 structure where they may also be referred to as tunnel cations. Therefore, the counter cation can be selected to facilitate the selection, formation and stabilization of a desired product, such as the aforementioned [M]-OMS-2 structure, or to have a lesser effect (as with the smaller cations such as sodium and magnesium) so as to allow other preferred structures to form and/or to permit template materials other than the counter ion to act on the reaction solution. The ionic radii of some alkali and alkaline earth metal cations which can be thus employed are listed below:

| Cation | Li | Na | K | Cs | Mg | Ca | Ba |
|---|---|---|---|---|---|---|---|
| r (Å) | 0.68 | 0.98 | 1.33 | 1.89 | 0.65 | 0.99 | 1.35 |

In general, the source of permanganate anion can be an alkali or alkaline earth metal permanganate such as the permanganates of sodium, potassium, cesium, magnesium, calcium and barium. Permanganates including the ammonium or tetraalkyl-ammonium salts can also be used. However, the counter cation of the permanganate anion in some cases is more than just a vehicle for achieving solubility of the permanganate, e.g., when it also functions as the template for forming the molecular sieve.

The general formula of [M]-OMS-1 is $$A_a[M_b Mn_{12-b}O_{24}] \cdot nH_2O$$

wherein A is a +1, +2, +3 or +4 counter cation, $0 \leq a \leq 6$, M is a +1, +2, +3 or +4 framework-substituting metal cation, $0 \leq b \leq 12$ and n is $\geq 0$.

And, the general formula of [M]-OMS-2 is $$A_a[M_b Mn_{8-b}O_{16}] \cdot nH_2O$$

wherein A is a +1, +2, +3 or +4 counter cation, $0 \leq a \leq 6$, M is a +1, +2, +3 or +4 framework-substituting metal cation, $0 > b > 8$ and n is $> 0$.

The preferred synthesis of a framework substituted manganese oxide octahedral sieve of this invention will depend to some extent on which particular product is desired. The synthesis of an [M]-OMS-1 material employs a substituted manganese oxide octahedral layered material, designated [M]-OL, as a precursor. [M]-OMS-2 structures and the aforesaid [M]-OL precursors are prepared by the redox reaction of $Mn^{+2}$ and $MnO_4^-$. The products one obtains are dependent on the reaction conditions, e.g., temperature, pH, ratio of $MnO_4/Mn^{+2}$, the nature of the counter cation or other templating agent if present and the time of reaction. The purity of the resulting product can be characterized by such techniques as X-Ray Diffraction (XRD), Transmission Electron Microscopy (TEM), Thermal Gravimetric Analysis (TGA), Fourier Transform Infra-Red (FTIR) and adsorption analysis.

A general synthesis of an [M]-OMS-1 material advantageously comprises the following steps:

a) reacting a source of manganese cation, a source of framework-substituting metal cation and a source of permanganate anion under basic conditions to provide an [M]-OL in which [M] designates the framework-substituting metal and OL designates the manganese oxide octahedral layered material;

b) exchanging the [M]-OL with a source of counter cation; and, c) heating the exchanged [M]-OL to provide the [M]-OMS-1 material.

The manganese cation can be supplied by manganous salts such as $MnCl_2$, $Mn(NO_3)_2$, $MnSO_4$, $Mn(CH_3COO)_2$, etc. The permanganate anion can be supplied by permanganate salts such as $Na(MnO_4)$, $KMnO_4$, $Mg(MnO_4)_2$, $Ca(MnO_4)_2$, $Ba(MnO_4)_2$, $NH_4(MnO_4)_2$, etc. Bases which can be used to provide an alkaline reaction medium include NaOH, KOH, tetraalkyl ammonium hydroxides, and the like. The basic reaction mixture is preferably aged, e.g., for at least 1 day and more preferably for at least about 7 days prior to the exchanging step. The source of counter cation used to ion exchange the [M]-OL is advantageously a magnesium salt, e.g., $MgCl_2$ or $Mg(CH_3COO)_2$, which are preferred, or $MgSO_4$. The conditions of heating, e.g., autoclaving, of the exchanged [M]-OL can include a temperature of from about 100° C. to about 200° C. for at least about 10 hours and preferably from about 130° C. to about 170° C. for from about 2 to about 5 days.

Figure 1A:
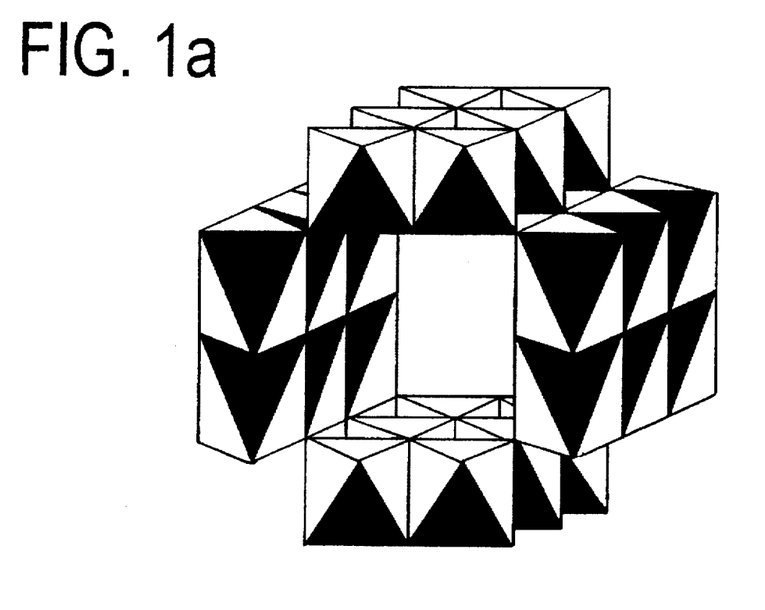
FIGS. 1a and 1b are diagrammatic representations of the three-dimensional framework tunnel structures of [M]-OMS-2 and [M]-OMS-1 respectively.
Figure 1B:
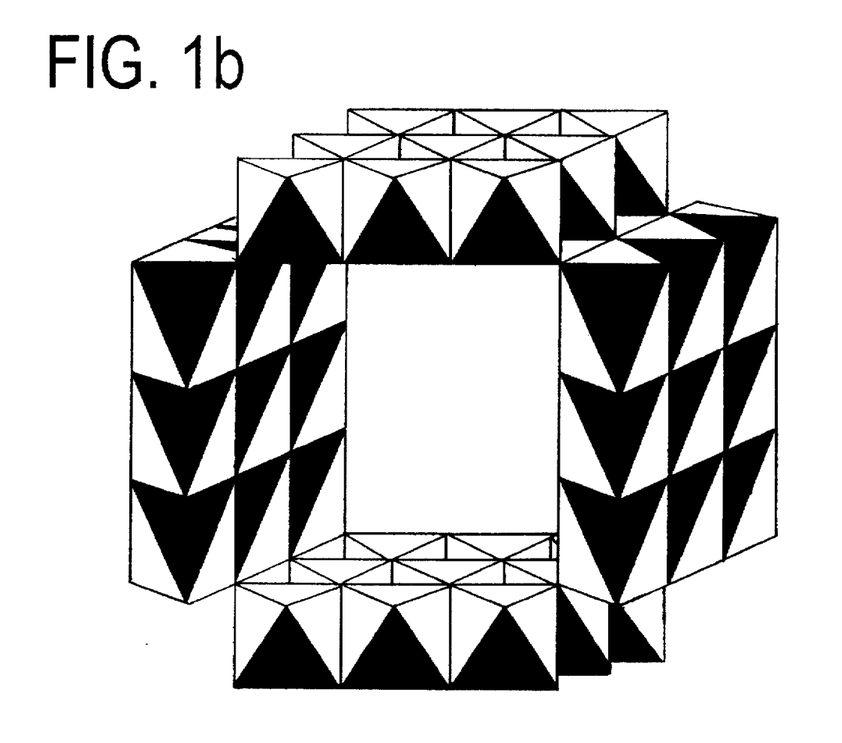
Figure 2:
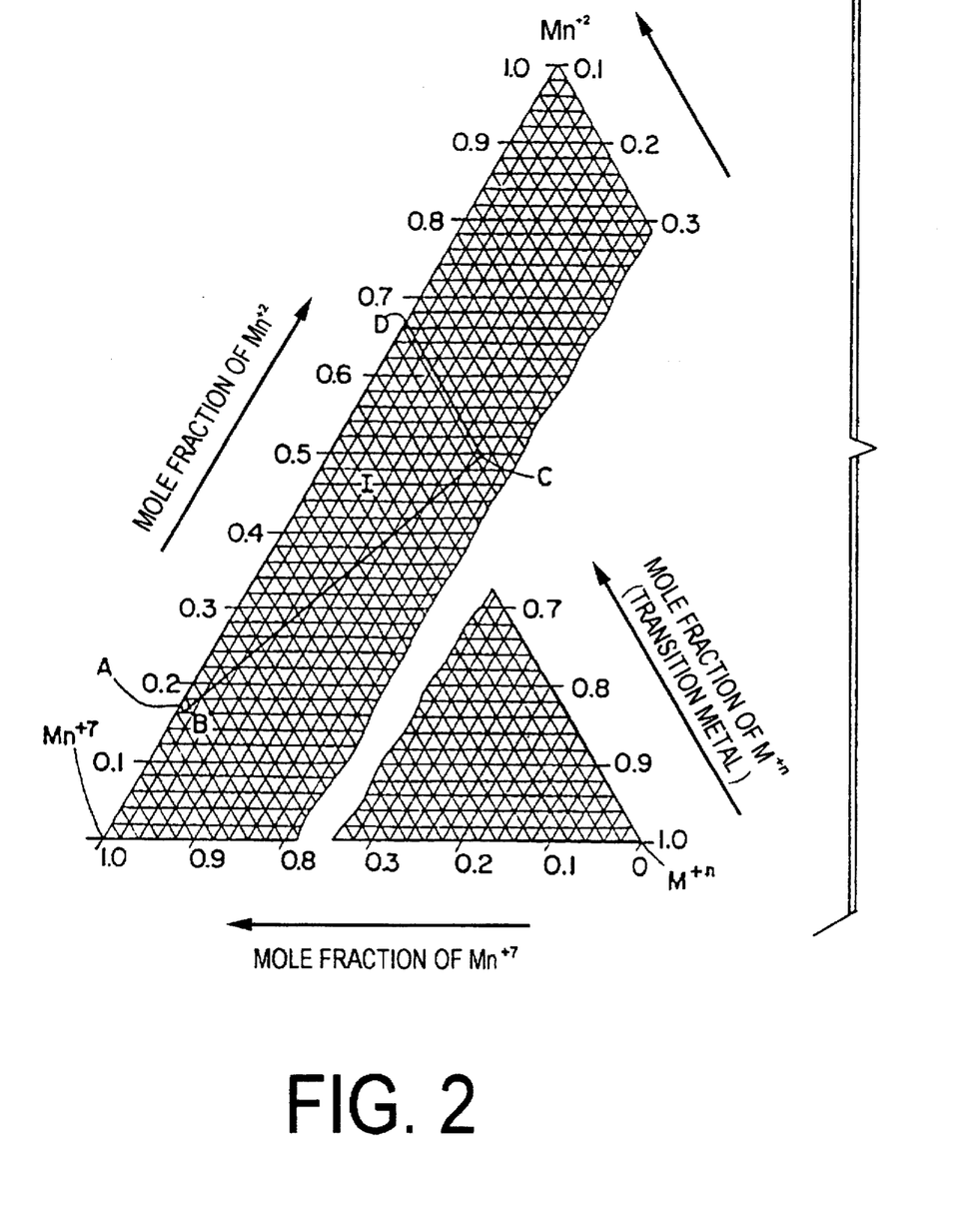
FIG. 2 is a ternary diagram in which compositional area I (ABCD) indicates the operable ranges of the reactants $Mn^{+2}$, $MnO_4$, and $M^{+n}$ in the reaction mixture, expressed as mole fractions, for preparing [M]-OMS-2 structures.
Figure 3:
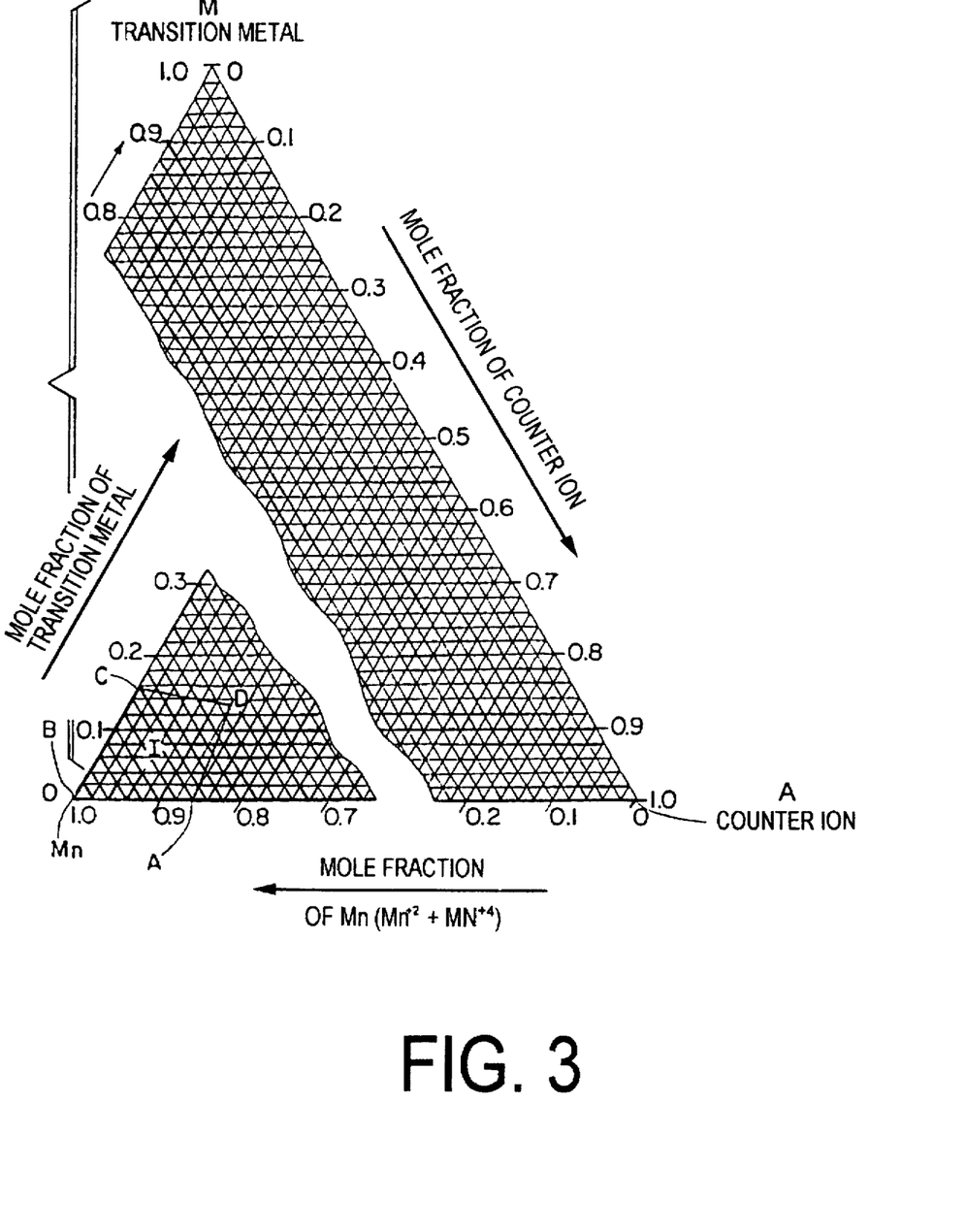
FIG. 3 is a ternary diagram in which compositional area I (ABCD) indicates the mole fractions of the components A (counter cation), M (framework-substituting metal) and Mn in [M]-OMS-2 structures.
Figure 4:
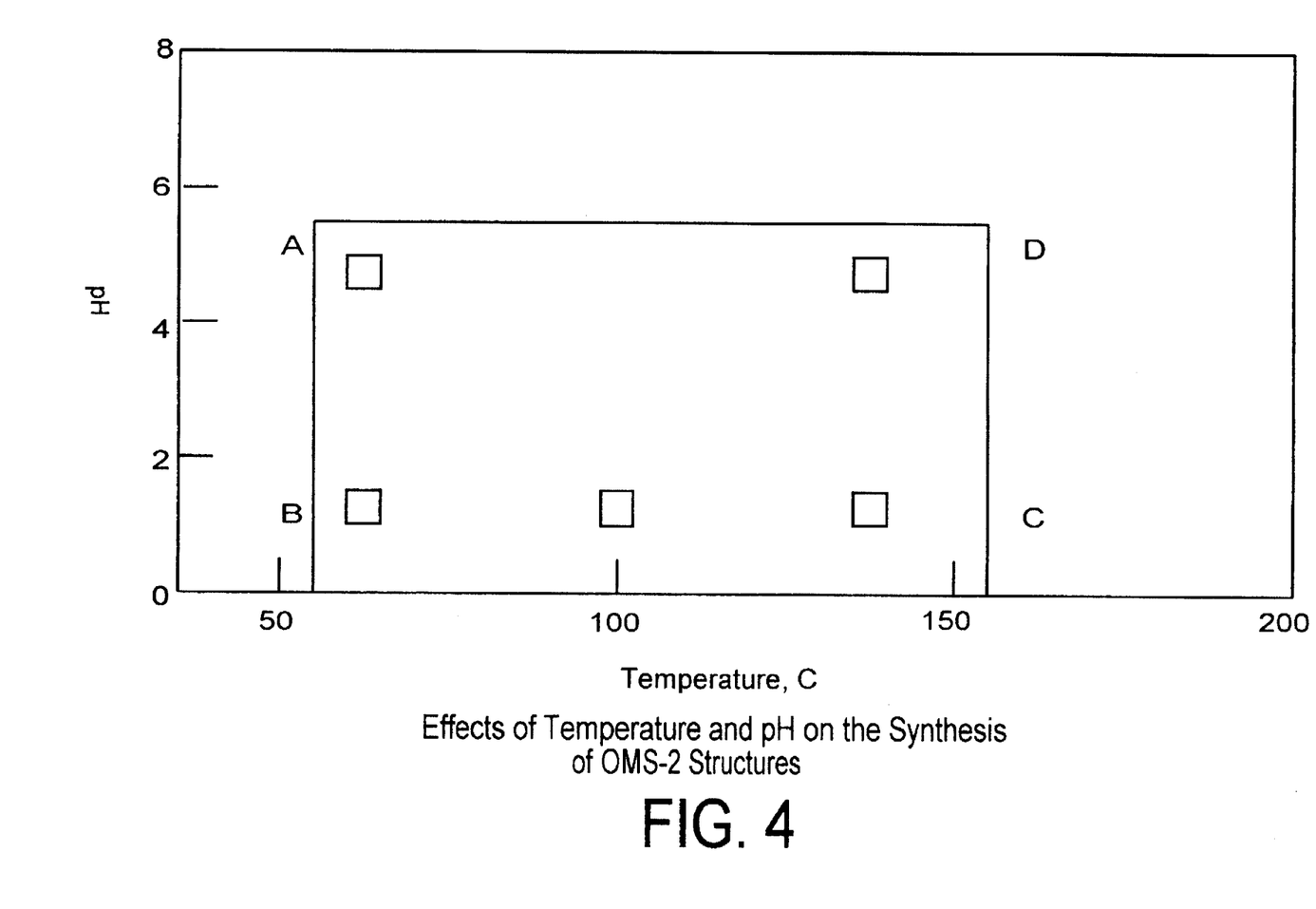
FIG. 4 is a plot indicating the operable conditions of pH and temperatures under which [M]-OSM-2 structures can be prepared; and, FIG. 5 presents the x-ray powder diffraction patterns of certain [M]-OMS-2 materials of the present invention and certain naturally occurring manganese oxide hydrate minerals.

A general synthesis of an [M]-OMS-2 material advantageously comprises heating a reaction mixture which includes a source of manganese cation, a source of framework-substituting metal cation, a source of counter cation and a source of permanganate anion under acidic conditions to provide the [M]-OMS-2. Suitable acids for adjusting the pH of the reaction mixture include the mineral acids, e.g., HCl, $H_2SO_4$, $HNO_3$ and strong organic acids such as toluene sulfonic acid and trifluoroacetic acid. The concentrations of manganese cations (given as the manganous cation, $Mn^{+2}$), framework-substituting metal cations and permanganate anions of the reaction mixture can be as indicated in region I (ABCD) of the ternary diagram of FIG. 2 in which case the resulting [M]-OMS-2 product will have a chemical composition as indicated in the compositional region I (ABCD) of the ternary diagram of FIG. 3.

The molar ratio of permanganate anion to manganous cation, $[MnO_4^-]/[Mn^{+2}]$, which can be expressed as $[Mn^+ 7]/[Mn^{+2}]$ for convenience, is one of the critical factors or parameters in determining the nature of the product and can range broadly from about 0.2 to about 3.0. In preferred embodiments, this ratio can range from about 0.3 to 0.4 for the production of an [M]-OSM-1 material, from about 0.2 to 0 about 1.4 for the production of an [M]-OSM-2 material, from about 1.75 to about 2.2 for mixtures of [M]-OSM-2 and nsutites and from about 2.5 to about 3 for nsutites.

The pH of the reaction mixture and the reaction temperature are interrelated parameters which can be varied in conjunction with the ratio of $[MnO_4^-]/[Mn^{+2}]$ and the nature of the template to influence the structure and the quality of the product. In general, the pH should be less than about 4.5 for the production an of [M]-OMS-2 material and preferably, the pH is in the range of from about 0 to about 4 and more preferably is from about 0.5 to about 2. A pH range of from about 1 to about 3 is presently preferred for the production of materials of the [M]-OMS-2 structure. At high pH, e.g., greater than about 13, the precursor of [M]-OMS-1, the aforementioned framework substituted octahedral layered material [M]-OL is formed.

The reaction temperatures can range broadly from about 40° C. to about 255° C. with the lower end of this temperature range tending to produce slower reactions. Temperatures in the range of from about 40° to about 70° C. will tend to produce the nsutite structures which have generally low crystallinities but contain structures characterized by tunnels of dimension 1×n where the basic unit dimension is a manganese oxide octahedron and can be an integer of 1 or 2. Again, given an appropriate pH, the process of the invention can be carried out to produce materials of the [M]-OMS-2 structure at temperatures ranging from about 70° C. to about 155° C., preferably from about 80° to about 120° C. and more preferably from about 90° to about 110° C. For the production of [M]-OMS-1 materials, the temperature is preferably in the range of from about 130° to about 170° C. and for pyrolusite (1×1) structures, the temperature is preferably from about 155° C. to about 255° C.

The molecular sieves of this invention possess acid sites, including Lewis and Bronsted sites. Applications include acid catalyzed reactions such as isomerization and polymerization.

The following examples are presented to illustrate specific embodiments of the practice of this invention and are not to be interpreted as limitations upon the scope of the invention. Unless otherwise specified, all amounts and proportions are by weight.

COMPARATIVE EXAMPLE A

Hydrothermal Preparation of Unsubstituted K-OMS-2

This example, while not within the scope of the invention, is presented to illustrate a procedure for the hydrothermal synthesis of an OMS-2 structure containing no framework manganese substitution.

A portion amounting to 0.04 mole (6.76 g) of $MnSO_4 \cdot H_2O$ was dissolved in 40 ml of water. The pH of the solution was adjusted to 1.0 by concentrated $HNO_3$. An aqueous permanganate solution prepared by dissolving 0.028 mole (4.40 g) of $KMnO_4$ in 150 ml water was then added slowly to the previous solution with vigorous stirring. The pH of the mixture was readjusted to 1.0. The mixture was transferred to a glass liner and sealed in a stainless steel autoclave. The autoclave was placed in an oven and maintained at 100° C. for 16 hours. After reaction, the autoclave was cooled and the resulting black precipitate was filtered and washed thoroughly with water. The sample was dried at 120° C. for 16 hours. The molar ratio $[Mn^{+2}]/[Mn^{+7}]$ was 1.44 and the average oxidation state was 4.05. The yield was 6.18 g and the sample had a specific surface area of 260 $m^2/g$. Elemental analysis by atomic absorption spectroscopy indicated 57.9 weight percent Mn and 4.5 weight percent K, resulting in a Mn/K ratio of 9.14. Table I below sets forth the x-ray powder diffraction data for the sample. The experimental pattern of the sample correlates well with the standard pattern for natural cryptomelane (potassium manganese oxide) taken from the Joint Committee on Powder Diffraction Standards (JCPDS). The K-OMS-2 product was also examined by scanning electron microscope to verify its crystal form.

TABLE I

MAJOR LINES IN THE X-RAY DIFFRACTION PATTERN OF HYDROTHERMALLY SYNTHESIZED UNSUBSTITUTED K-OMS-2

| D SPACING (Å) | Intensity 100 I/Io |
|---|---|
| 7.0 | 75 |
| 4.9 | 60 |
| 3.40 | 10 |
| 3.10 | 65 |
| 2.45 | 15 |
| 2.39 | 100 |
| 2.31 | 5 |
| 2.20 | 10 |
| 2.15 | 40 |
| 1.92 | 5 |
| 1.83 | 40 |
| 1.63 | 10 |

COMPARATIVE EXAMPLE B

Hydrothermal Preparation of Unsubstituted Ba-OMS-2

As with Example A, the following comparative example illustrates the hydrothermal synthesis of an OMS-2 structure containing no framework manganese substation.

A portion amounting to 0.04 mole (9.8g) of $Mn(CH_3COO)_2 \cdot 4H_2O$ was dissolved in 60 ml of water. The pH of the solution was adjusted to 1.0 by concentrated $HNO_3$. An aqueous permanganate solution prepared by dissolving 0.014 mole (5.22 g) of $Ba(MnO_4)_2$ in 150 ml water was then added slowly to the previous solution with vigorous stirring. The pH of the mixture was readjusted to 1.0. The mixture was transferred to a glass liner and sealed in a stainless steel autoclave. The autoclave was placed in an oven and maintained at 100° C. for 16 hours. After reaction, the autoclave was cooled and the resulting black precipitate was filtered and washed thoroughly with water. The sample was dried at 120° C. for 16 hours. The yield was 6.29 g and the sample contained 4.10 weight percent Ba and 58.2 weight percent Mn and had a specific surface area of 341 $m^2/g$. Table II below sets forth the x-ray diffraction data for the sample. The experimental pattern of the sample correlates well with the JCPDS standard pattern for natural hollandite (barium potassium manganese oxide hydrate).

TABLE II

MAJOR LINES IN THE X-RAY DIFFRACTION PATTERN OF HYDROTHERMALLY-SYNTHESIZED UNSUBSTITUTED Ba-OMS-2

| D SPACING (Å) | Intensity 100 I/Io |
|---|---|
| 7.0 | 45 |
| 4.9 | 30 |
| 3.49 | 15 |
| 3.13 | 50 |
| 2.40 | 100 |
| 2.31 | 15 |
| 2.22 | 15 |
| 2.16 | 40 |
| 2.13 | 15 |
| 1.83 | 35 |
| 1.82 | 15 |
| 1.64 | 20 |

EXAMPLES 1–4

Hydrothermal Preparations of [M]-OMS-2 Materials

Additional syntheses were performed using the general procedure of Comparative Examples A and B with variations and modifications intended to provide particular [M]-OMS-2 species containing various framework-substituting metals.

EXAMPLE 1

Hydrothermal Preparation of [Co]-OMS-2

Quantities amounting to 0.03 mole (5.07 g) of $MnSO_4 \cdot H_2O$ and 0.01 mole (2.91 g) of $Co(NO_3)_2 \cdot 6H_2O$ were dissolved in 60 ml of water. The pH of the solution was adjusted to 1.0 by concentrated $HNO_3$. An aqueous permanganate solution prepared by dissolving 0.28 mole (4.4 g) of $KMnO_4$ in 150 ml water was then added slowly to the previous solution with vigorous stirring. The pH of the final solution was readjusted to 1.0. The mixture was transferred to a glass liner and sealed in a stainless steel autoclave. The autoclave was placed in an oven maintained at 100° C. for 16 hours. After reaction, the autoclave was cooled and the resulting black precipitate was filtered and washed thoroughly with water. The sample was dried at 120° C. for 16 hours. The yield was 5.62 g and the sample contained 4.13 weight percent K, 52.8 weight percent Mn, and 5.76 weight percent Co based upon elemental analysis by atomic absorption spectroscopy. Table III below sets forth the x-ray diffraction data for the sample.

TABLE III

X-RAY DIFFRACTION DATA OF [Co]-OMS-2

| D SPACING (Å) | 100 I/Io |
|---|---|
| 7.0 | 90 |
| 4.9 | 40 |
| 3.53 | 5 |

TABLE III-continued

X-RAY DIFFRACTION DATA OF [Co]-OMS-2

| D SPACING (Å) | 100 I/Io |
| --- | --- |
| 3.12 | 55 |
| 2.39 | 100 |
| 2.15 | 40 |
| 1.83 | 25 |
| 1.63 | 10 |

Figure 5:
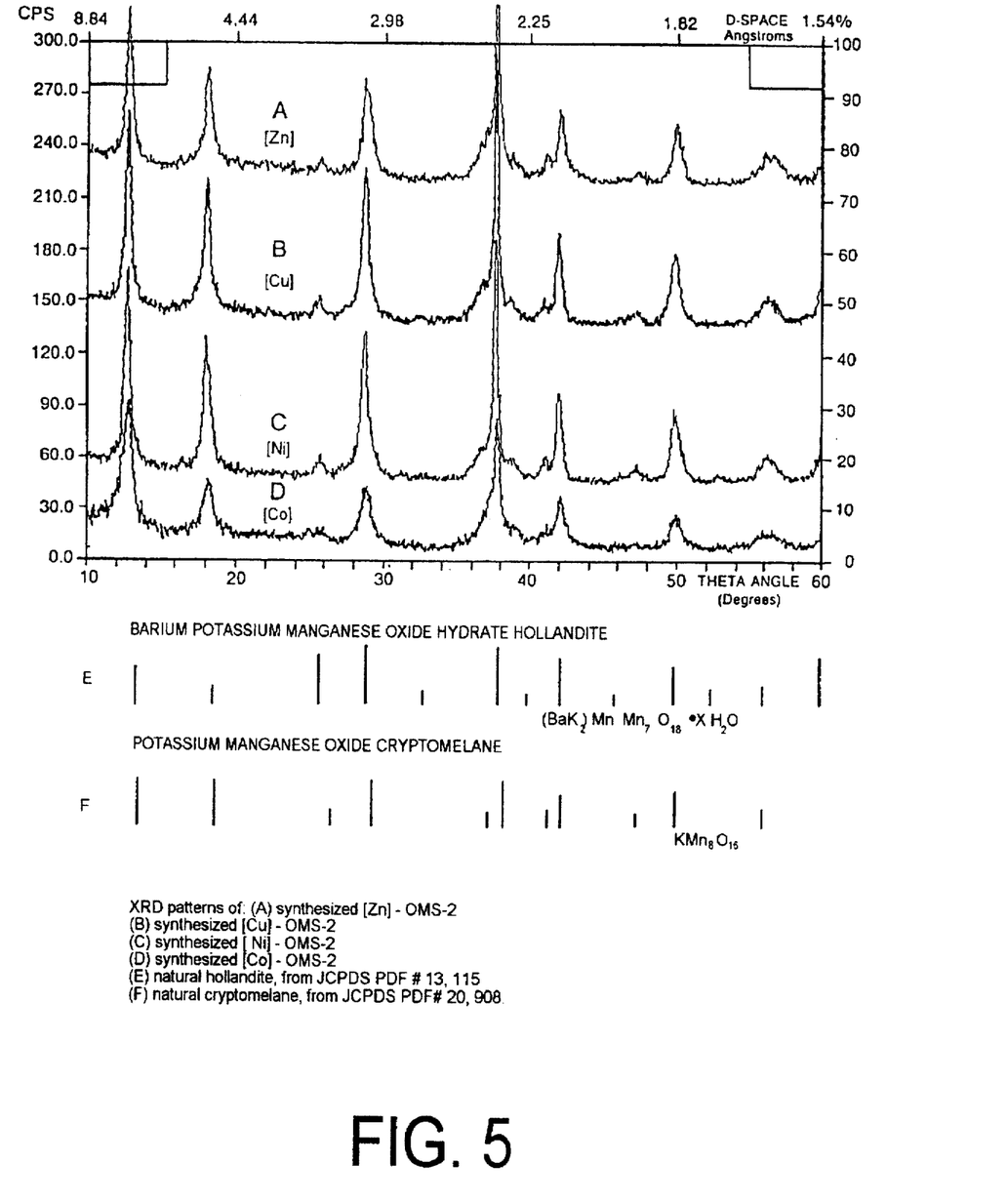

FIG. 5 presents the x-ray diffraction patterns for sample A and natural hollandite and cryptomelane minerals. The experimental pattern for sample D correlates well with patterns E and F for natural hollandite (barium potassium manganese oxide hydrate) and cryptomelane (potassium manganese oxide).

In addition to the procedures described for this specific embodiment, [Co]-OMS-2 can also be synthesized under the following general conditions:

1. The $Mn^{+2}$ salt can be any suitable salt such as $Mn(NO_3)_2$, $MnSO_4$ or $Mn(CH_3COO)_2$.
2. The permanganate salt can be an alkali or alkaline earth metal salt such as $NaMnO_4$, $KMnO_4$, $CsMnO_4$, $Mg(MnO_4)_2$, $Ca(MnO_4)_2$ or $Ba(MnO_4)_2$.
3. The cobalt source can be any suitable cobalt salt of appropriate solubility.
4. The mole ratio of $([Mn^{+2}]+[Co^{+2}])/[MnO_4^-]$ can be between about 0.2 and about 2 with a preferred ratio being about 1.44.
5. The mole fraction of $[Co^{+2}]/([Co^{+2}]+[Mn^{+2}])$ can be an effective amount between 0 and about 0.3 with the extent of substitution depending on the ratio.
6. The pH of the mixture can be between 0 and about 4.5, preferably between 0 and about 4, with a particularly preferred pH being about 1.
7. The temperature of the reaction can be from about 60° to about 160° C. with a preferred temperature being about 100° C.

EXAMPLE 2

Hydrothermal Preparation of [Ni]-OMS-2

Quantities amounting to 0.03 mole (5.07 g) of $MnSO_4 \cdot H_2O$ and 0.01 mole (2.91 g) of $Ni(NO_3)_2 \cdot 6H_2O$ were dissolved in 60 ml of water. The pH of the solution was adjusted to 1.0 by concentrated $HNO_3$. An aqueous permanganate solution prepared by dissolving 0.028 mole (4.4 g) of $KMnO_4$ in 150 ml water was then added slowly to the previous solution with vigorous stirring. The pH of the final solution was readjusted to 1.0. The mixture was transferred to a glass liner and sealed in a stainless steel autoclave. The autoclave was placed in an oven and maintained at 100° C. for 16 hours. After reaction, the autoclave was cooled and the resulting black precipitate was filtered and washed thoroughly with water. The sample was dried at 120° C. for 16 hours. The yield was 5.26 g and the sample contained 4.51 weight percent K, 57.5 weight percent Mn and 0.91 weight percent Ni based upon elemental analysis. Table IV below and FIG. 5 present the x-ray diffraction data and pattern for sample C, respectively. The experimental pattern for sample C correlates well with patterns E and F for natural hollandite (barium potassium manganese oxide hydrate) and cryptomelane (potassium manganese oxide).

In addition to the procedures described for this specific embodiment, [Ni]-OMS-2 can also be synthesized under conditions similar to these described in Example 1 above for [Co]-OMS-2.

TABLE IV

X-RAY DIFFRACTION DATA OF [Ni]-OMS-2

| D SPACING (Å) | 100 I/Io |
| --- | --- |
| 7.0 | 80 |
| 4.9 | 55 |
| 3.46 | 10 |
| 3.10 | 60 |
| 2.39 | 100 |
| 2.19 | 10 |
| 2.15 | 40 |
| 1.93 | 5 |
| 1.83 | 30 |
| 1.63 | 10 |

EXAMPLE 3

Hydrothermal Preparations of [Cu]-OMS-2

Quantities amounting to 0.03 mole (5.07 g) of $MnSO_4 \cdot H_2O$ and 0.01 mole (1.38 g) of $Cu(NO_3)_2 \cdot 5H_2O$ were dissolved in 60 ml of water. The pH of the solution was adjusted to 1.0 by concentrated $HNO_3$. An aqueous permanganate solution prepared by dissolving 0.028 mole (4.4 g) of $KMnO_4$ in 160 ml water was then added slowly to the previous solution with vigorously stirring. The pH of the final solution was readjusted to 1.0. The mixture was transferred to a glass liner and sealed in a stainless steel autoclave. The autoclave was placed in an oven and maintained at 100° C. for 16 hours. After reaction, the autoclave was cooled and the resulting black precipitate was filtered and washed thoroughly with water. The sample was dried at 120° C. for 16 hours. The yield was 5.10 g and the sample contained 3.14 weight percent K, 56.9 weight percent Mn and 1.99 weight percent Cu based upon elemental analysis. Table V below and FIG. 5 present the x-ray diffraction data and pattern of sample B, respectively. The experimental pattern for sample B correlates well with patterns E and F for natural hollandite (barium potassium manganese oxide hydrate) and crytomelane (potassium manganese oxide).

In addition to the procedures described for this specific embodiment, [Cu]-OMS-2 can also be synthesized under conditions similar to these described in Example 1 above for [Co]-OMS-2.

TABLE V

X-RAY DIFFRACTION DATA OF [Cu]-OMS-2

| D SPACING (Å) | 100 I/Io |
| --- | --- |
| 7.0 | 70 |
| 4.9 | 45 |
| 3.47 | 10 |
| 3.11 | 50 |
| 2.39 | 100 |
| 2.33 | 5 |
| 2.20 | 10 |
| 2.16 | 75 |
| 1.93 | 5 |
| 1.83 | 25 |
| 1.63 | 10 |

EXAMPLE 4

Hydrothermal Preparation of [Zn]-OMS-2

Quantities amounting to 0.03 mole (5.07 g) of $MnSO_4 \cdot H_2O$ and 0.01 mole (2.97 g) of $Zn(NO_3)_2 \cdot 6H_2O$ were dissolved in 60 ml of water. The pH of the solution was adjusted to 1.0 by concentrated $HNO_3$. An aqueous permanganate solution prepared by dissolving 0.028 mole (4.4 g) of $KMnO_4$ in 150 ml water was then added slowly to the previous solution with vigorously stirring. The pH of the final solution was readjusted to 1.0. The mixture was transferred to a glass liner and sealed in a stainless steel autoclave. The autoclave was placed in an oven and maintained at 100° C. for 16 hours. After reaction, the autoclave was cooled and the resulting black precipitate was filtered and washed thoroughly with water. The sample was dried at 120° C. for 16 hours. The yield was 4.94 g and the sample contained 3.109 weight percent K, 58.0 weight percent Mn and 0.68 weight percent Zn based upon elemental analysis. Table VI below presents the x-ray diffraction data for sample A and natural hollandite and cryptomelane minerals. The experimental pattern for sample A correlates well with patterns E and F for natural hollandite and cryptomelane.

In addition to the procedures described for this specific embodiment, [Zn]-OMS-2 can also be synthesized under the conditions described above in Example 1 for [Co]-OMS-2.

TABLE VI

| X-RAY DIFFRACTION DATA OF [Zn]-OMS-2 | |
|---|---|
| D SPACING (Å) | 100 I/Io |
| 7.0 | 75 |
| 4.9 | 50 |
| 3.46 | 5 |
| 3.11 | 50 |
| 2.39 | 100 |
| 2.32 | 10 |
| 2.20 | 10 |
| 2.15 | 35 |
| 1.92 | 5 |
| 1.83 | 30 |
| 1.63 | 10 |

COMPARATIVE EXAMPLE C and EXAMPLES 5–9

Comparative Example C illustrates the preparation of an OMS-2 material containing no framework manganese substitution employing a refluxing procedure and Examples 5–9 illustrate the preparation of various [M]-OMS-2 materials employing this procedure.

COMPARATIVE EXAMPLE C

A solution of 5.89 g $KMnO_4$ in 100 mL water was added to a solution of 8.8 g $MnSO\cdot_4H_2O$ in 30 mL water and 3 mL concentrated $HNO_3$. The solution was refluxed at 100° C. for 24 hours and the product was filtered, washed and dried at 120° C. XRD showed the characteristic pattern of natural hollandite.

EXAMPLES 5–9

A solution of 5.89 g $KMnO_4$ in 100 ml water was added to a solution of 8.8 g $MnSO_4\cdot H_2O$ in 30 ml water and 3 ml concentrated $HNO_3$. After mixing, 20 ml each of sulfate salt solutions of $Cr^{+2}$, $Fe^{2+}$, $Co^{2+}$, $Ni^{2+}$ and $Cu^{2+}$ as the sources of framework-substituting metal cations were added to each preparation. The total concentration of the framework metal-substituting metal cations in each reaction solution was 0.1M. The reaction solutions were then refluxed at 100° C. for 24 hours and the resulting products were filtered, washed four times with 50 ml water and dried at 120° C. overnight.

XRD showed characteristic OMS-2 peaks when OMS-2 was synthesized in the presence of $Cr^{+2}$, $Cu^{2+}$, $Ni^{2+}$ or $Fe^{2+}$. Peak intensity was greater for OMS-2 synthesized in the absence of the framework-substituting metal cations. Crystallinity of the [M]-OMS-2 products was poor and XRD showed no other crystalline phases. For the $Fe^{2+}$ system, synthesis at a level of 0.1M $Fe^{2+}$ resulted in a non-OMS-2 crystalline material. Increasing the concentration of $Fe^{2+}$ to 0.5M resulted in the formation of [Fe]-OMS-2. EDX analysis of the products of Comparative Example C and Examples 5–9 are set forth below in Table VII.

TABLE VII

Energy Dispersive X-Ray (EDX) Microanalysis of Reaction Products

| | Mole Fraction | | | |
|---|---|---|---|---|
| Example | % K | % Mn | % [M] | Mn/K |
| Comparative Example C: OMS-2 | 5.15 | 94.85 | — | 18.4 |
| 5: [Cr]-OMS-2 | 4.52 | 89.34 | 6.14 | 19.8 |
| 6: [Fe]-OMS-2 | 7.63 | 36.88 | 55.49 | 4.8 |
| 7: [Co]-OMS-2 | 3.59 | 93.56 | 2.85 | 26.1 |
| 8: [Ni]-OMS-2 | 5.52 | 93.48 | 1.00 | 16.9 |
| 9: [Cu]-OMS-2 | 4.74 | 92.21 | 3.05 | 19.5 |

EXAMPLES 10–12

Employing substantially the same procedures and conditions as before, $Mn(NO_3)_2$, $KMnO_4$ and various concentrations of $Co(NO_3)_2$ were reacted overnight (15 hours) at a pH of 1.0. The ratio $[Mn^{+2}]+[Co^{+2}]/[Mn^{+7}]$ was 1.437 and the average oxidation state was 4.05. The data for these examples are summarized in Table VIII as follows:

TABLE VIII

Variation of $[M^{+n}]/([M^{+n}] + [Mn^{+2}])$ Ratio

| | Example 10 | Example 11 | Example 12 |
|---|---|---|---|
| $[Mn^{+2}]/[Mn^{+7}][Co^{+2}]$ | 1.08 | 0.97 | 0.86 |
| $[Mn^{+2}] + [Co^{+2}]$ | 0.24 | 0.32 | 0.4 |
| Tunnel Structure: (by XRD) | 2 × 2 | birnesite (low crystallinity) | birnesite |
| Elem. Anal., Wt % (by atomic absorption spectroscopy) | | | |
| Mn | 53.1 | | |
| K, etc. | 3.17 | | |
| Mn/K | 11.92 | | |
| M | 4.86 | | |

The results set forth in Table VIII appear to indicate that the fraction of $Mn^{+2}$ which can be replaced by $Co^{+2}$ or other framework-substituting metal cations is limited. At high concentrations of $Co^{+2}$, the [Co]-OMS-2 structure was not formed. However, at low molar ratios of $[Mn^{+2}]/[Mn^{+7}]$ and in the absence of $Co^{+2}$, [M]-OMS-2 structures were obtained.

EXAMPLES 13 AND 14

These examples illustrate the preparation of [M]-OMS-2 materials in which [M] is lanthanum or palladium.

Employing substantially the same procedures and conditions as before, $Mn(SO_4)_2$, $KM_nO_4$ and the nitrates of lanthanum and palladium were reacted overnight (15 hours) at a pH of 1.0. The data for these examples are summarized in Table IX as follows:

TABLE IX

Group VIII Framework-substituting Metals

| | Example 13 | Example 14 |
|---|---|---|
| Framework-substituting Cations | $La^{+3}$ | $Pd^{+2}$ |
| $[Mn^{+2}]/([Mn^{+7}]$ $[Mn^{+7}])$ | 1.437 | 1.437 |
| $[Mn^{+2}]$ $[Mn^{+2}]/[Mn^{+7}]$ | 1.078 | 1.078 |
| Avg. ox. state | 4.2 | 4.2 |
| Tunnel Structure: (by XRD) | 2 × 2 | 2 × 2 nsutite (low crystallinity) |
| Elem. Anal., Wt % (by atomic absorption spectroscopy) | | |
| Mn | | 56.5 |
| K, etc. | | 2.57 |
| Mn/K | | 15.6 |
| M | | 1.36 |

EXAMPLES 15–20

Hydrothermal Preparation of [M]-OMS-1 Materials

An M-doped $Mn(OH)_2$ suspension was first prepared by adding 8.0 mL of 0.10 molar $MCl_2$ (M=Mg, Co, Ni, Cu, Zn, and Cd) to 60 mL of 0.5 molar $MnCl_2$ and subsequently adding 75 mL of 6M NaOH thereto. About 60 mL of 0.20M $NaMnO_4$ was then slowly added to the suspension. The product was aged at room temperature for a week, then filtered and washed to remove Cl and $Na^+$ ions. XRD of the products thus obtained showed a birnesite-like layer structure. They are referred to as framework octahedral layered materials [M]-OL with M designating the framework metal cation and OL the octahedral layered material. The [M]-OL materials are used as precursors for the preparation of [M]-OMS-1 structures.

The [M]-OL in each example was exchanged with 500 mL of 1M $MgCl_2$ for 8 hours to give an $Mg^{2+}$-exchanged layered-structure material which showed the buserite XRD pattern. The exchanged layered-structure materials were hydrothermally treated in an autoclave at 160° C. for 30 hours. The products were finally filtered and washed. XRD patterns of the products were characteristic of natural todorokite.

The composition of each [M]-OMS-1 product is set forth in Table X as follows:

TABLE X

Composition of [M]-OMS-1 Materials

| | Example 15 [Mg]-OMS-1 | Example 16 [Co]-OMS-1 | Example 17 [Ni]-OMS-1 | Example 18 [Cu]-OMS-1 | Example 19 [Zn]-OMS-1 | Example 20 [Cd]-OMS-1 |
|---|---|---|---|---|---|---|
| Mn, wt % | 58.2 | n.a. | 52.9 | n.a. | 49.1 | 52.5 |
| Mg (counter cation), wt % | 2.70 | n.a. | 3.57 | n.a. | 3.42 | 3.29 |
| M (framework-substituting metal) wt % | | n.a. | 1.23 | n.a. | 1.16 | 2.32 |

What is claimed is:

1. A manganese oxide octahedral molecular sieve which possesses a 2×2 tunnel structure and in which a portion of the manganese present in the framework structure of the molecular sieve is substituted by another metal.

2. The molecular sieve of claim 1 possessing at least one counter cation in the tunnel structure thereof.

3. The molecular sieve of claim 1 wherein the framework-substituting metal is selected from the group consisting of a transition metal and lanthanum.

4. The molecular sieve of claim 1 wherein the framework substituting metal is selected from the group consisting of Mg, Fe, Co, Ni, Cu, Ti, V, Cd, Mo, W, Cr and Zn.

5. A process for preparing a manganese oxide octahedral molecular sieve having a 2×2 tunnel structure and in which a portion of the manganese present in the framework structure of the molecular sieve is substituted by another metal, said process comprising heating a reaction mixture containing sufficient concentrations of manganese cation, metal cation other than manganese cation, counter cation and permanganate anion under acidic conditions and at a sufficient pressure and temperature to provide the manganese oxide octahedral molecular sieve.

6. The process of claim 5 wherein the molar ratio of permanganate anion to manganese cation is from about 0.2 to about 2.0.

7. The process of claim 5 wherein the molar ratio of permanganate anion to manganese cation is from about 0.2 to about 1.4.

8. The process of claim 5 wherein the pH of the reaction mixture is less than about 4.5.

9. The process of claim 5 wherein the pH of the reaction mixture is from about 1 to about 3.

10. The process of claim 5 wherein heating is carried out at from about 70° C. to about 255° C. under autogenous pressure for from about 0.5 to about 20 hours.

11. The process of claim 5 wherein heating is carried out at from about 80° C. to about 120° C. under autogenous pressure for from about 1 to about 10 hours.

* * * * *

UNITED STATES PATENT AND TRADEMARK OFFICE
CERTIFICATE OF CORRECTION

PATENT NO. : 5,702,674
DATED : Dec. 30, 1997
INVENTOR(S) : Chi-Lin O'Young, Yan-Fei Shen, Roberto Nguyen Dequzman and Steven Lawrence Suib It is certified that error appears in the above-identified patent and that said Letters Patent is hereby corrected as shown below:

Col. 5, line 22, "0>b>8 and n is >0" should be --$0 \leq b \leq 8$ and $n \geq 0$--, Col. 6, lines 21-22, "from about 0.2 to 0 about 1.4" should be --from about 0.2 to about 1.4--.

Signed and Sealed this

Twelfth Day of May, 1998

Attest:

BRUCE LEHMAN

*Attesting Officer*  *Commissioner of Patents and Trademarks*